US009169833B2

(12) United States Patent
McCormick et al.

(10) Patent No.: US 9,169,833 B2
(45) Date of Patent: Oct. 27, 2015

(54) DEVICE FOR FASTENING AND ELECTRICALLY CONNECTING A CIRCUIT BOARD TO A MOTOR

(71) Applicants: Greg B. McCormick, Lafayette, IN (US); Gerald Hayes, Burlington, IN (US); Michael S. Richards, Kokomo, IN (US)

(72) Inventors: Greg B. McCormick, Lafayette, IN (US); Gerald Hayes, Burlington, IN (US); Michael S. Richards, Kokomo, IN (US)

(73) Assignee: Carter Fuel Systems, LLC, Cleveland, OH (US)

( * ) Notice: Subject to any disclaimer, the term of this patent is extended or adjusted under 35 U.S.C. 154(b) by 307 days.

(21) Appl. No.: 13/587,558

(22) Filed: Oct. 4, 2012

(65) Prior Publication Data

US 2014/0099217 A1 Apr. 10, 2014

(51) Int. Cl.
| | |
|---|---|
| *F04B 17/03* | (2006.01) |
| *F04D 13/06* | (2006.01) |
| *H02K 3/50* | (2006.01) |
| *H02K 11/00* | (2006.01) |
| *H02K 5/22* | (2006.01) |
| *F04D 5/00* | (2006.01) |

(Continued)

(52) U.S. Cl.
CPC ............... *F04B 17/03* (2013.01); *F04C 2/3445* (2013.01); *F04C 11/008* (2013.01); *F04C 15/008* (2013.01); *F04D 5/002* (2013.01); *F04D 13/0686* (2013.01); *F04D 13/0693* (2013.01); *H02K 3/522* (2013.01); *H02K 5/08* (2013.01); *H02K 5/225* (2013.01); *H02K 11/0073* (2013.01); *F04C 2210/1044* (2013.01); *F04C 2240/808* (2013.01); *Y10T 29/49117* (2015.01)

(58) Field of Classification Search
CPC . F04D 13/08; F04D 13/0686; F04D 13/0693; F04D 29/02; F04D 29/08; F04D 29/40; F04D 29/60; F04D 29/605; F04D 29/62; F04B 17/03; F04C 2210/1044; F04C 2240/808
USPC ..................................... 417/349, 357, 423.14
See application file for complete search history.

(56) References Cited

U.S. PATENT DOCUMENTS

| | | | |
|---|---|---|---|
| 4,673,834 A * | 6/1987 | Wrobel | 310/71 |
| 4,998,865 A | 3/1991 | Nakanishi et al. | |

(Continued)

FOREIGN PATENT DOCUMENTS

| | | |
|---|---|---|
| EP | 0615332 A1 | 9/1994 |
| EP | 1965485 A2 | 9/2008 |
| EP | 2336541 A1 | 6/2011 |

OTHER PUBLICATIONS

International Preliminary Report on Patentability, and Written Opinion of the International Searching Authority, dated Apr. 16, 2015, from related/corresponding PCT Patent Application Serial No. PCT/US13/55109, filed Aug. 15, 2013.

*Primary Examiner* — Bryan Lettman
*Assistant Examiner* — Timothy P Solak
(74) *Attorney, Agent, or Firm* — Jones Day

(57) ABSTRACT

A fuel pump assembly and method of making the same is disclosed. The fuel pump assembly includes a brushless direct current (BLDC) motor and a circuit board formed as a discrete component from the BLDC motor. The BLDC motor includes a stator with a plurality of windings. A screw, or some other fastener, extends through the circuit board and threadedly engages a portion of the BLDC motor. The screws serve the dual functions of attaching the circuit board to the BLDC motor and electrically connecting the BLDC motor to the circuit board to power the BLDC motor.

17 Claims, 4 Drawing Sheets

(51) Int. Cl.
   *F04C 2/344* (2006.01)
   *F04C 11/00* (2006.01)
   *F04C 15/00* (2006.01)
   *H02K 3/52* (2006.01)
   *H02K 5/08* (2006.01)

(56) References Cited

U.S. PATENT DOCUMENTS

| | | | |
|---|---|---|---|
| 5,053,664 A | | 10/1991 | Kikuta et al. |
| 5,296,770 A | * | 3/1994 | Pflueger et al. ............... 310/14 |
| 5,356,272 A | | 10/1994 | Nagata et al. |
| 5,908,286 A | * | 6/1999 | Clemmons .................. 417/44.2 |
| 5,961,293 A | * | 10/1999 | Clemmons et al. .......... 417/44.2 |
| 6,177,741 B1 | * | 1/2001 | Lutkenhaus et al. ............ 310/71 |
| 6,488,475 B2 | * | 12/2002 | Murata et al. .................... 417/32 |
| 6,652,249 B2 | | 11/2003 | Kenney et al. |
| 7,215,052 B2 | | 5/2007 | Blase et al. |
| 7,263,978 B2 | | 9/2007 | York et al. |
| 7,394,174 B2 | * | 7/2008 | Blase et al. ..................... 310/43 |
| 7,411,326 B2 | * | 8/2008 | Achor et al. ................. 310/68 B |
| 7,814,889 B2 | | 10/2010 | Mitsuhashi et al. |
| 7,847,457 B2 | | 12/2010 | Achor |
| 2001/0051098 A1 | | 12/2001 | Kenney et al. |
| 2005/0175479 A1 | * | 8/2005 | Gandrud et al. ............ 417/410.1 |
| 2007/0001535 A1 | * | 1/2007 | Mori ............................. 310/239 |
| 2008/0219867 A1 | * | 9/2008 | Sakata ........................ 417/410.1 |
| 2010/0209266 A1 | * | 8/2010 | Ikeda et al. ................. 417/410.1 |
| 2010/0223947 A1 | * | 9/2010 | Shibuya ........................ 62/323.3 |
| 2011/0057531 A1 | | 3/2011 | Achor |
| 2011/0091760 A1 | * | 4/2011 | Straubel et al. ................ 429/120 |
| 2012/0000556 A1 | | 1/2012 | Baek et al. |

* cited by examiner

FIG. 3
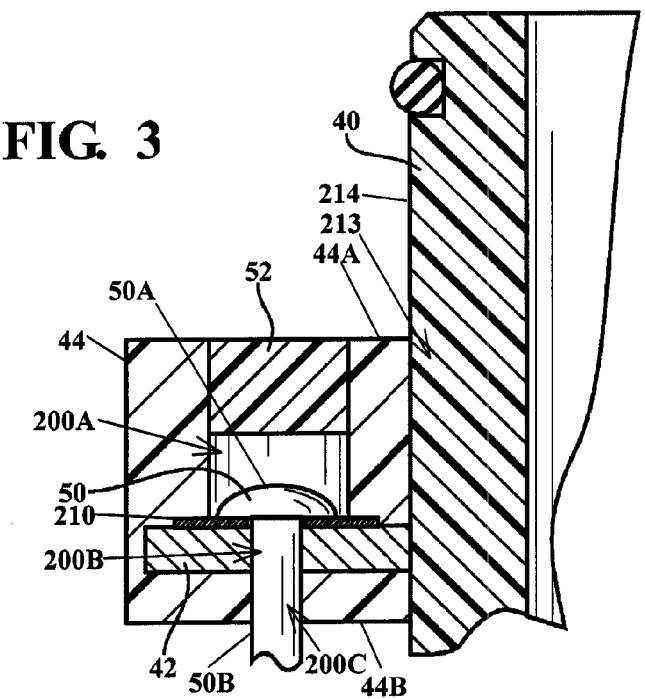
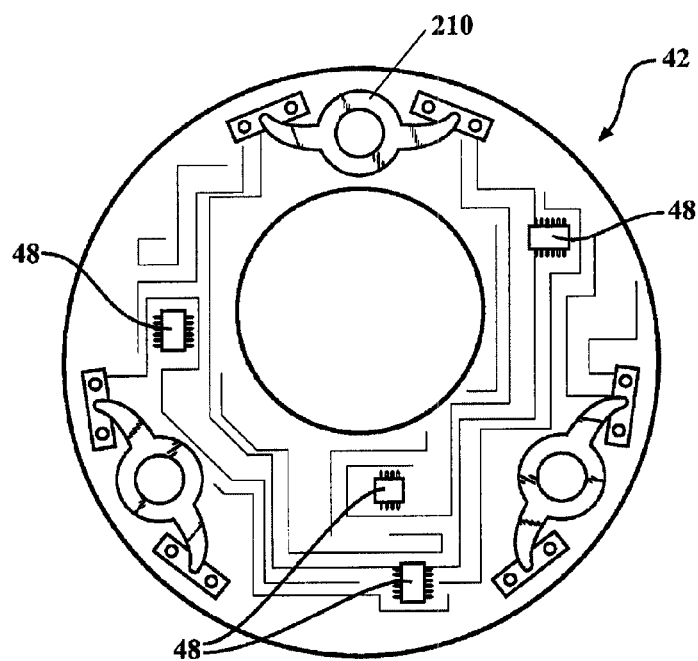
FIG. 4

DEVICE FOR FASTENING AND ELECTRICALLY CONNECTING A CIRCUIT BOARD TO A MOTOR

BACKGROUND OF THE INVENTION

1. Field of the Invention

The present invention relates generally to fuel pump assemblies, and more particularly to fuel pump assemblies including an electric motor and a circuit board for generating a current to power the electric motor.

2. Related Art

With the introduction of electronic control systems for electric motors, the automobile industry objectives of long life, reliability and low electro-magnetic (EM) interference for fuel pump assemblies have become achievable. This is in part due to the advent of brushless direct current (BLDC) motor technology. Typical BLDC motors include a stator with a plurality of windings and a rotor with a plurality of permanent magnets. Manipulation of the current applied to the windings generates an electromagnetic field, which acts on the permanent magnets to rotate the rotor. While known BLDC motor designs have achieved many objectives, problems still exist. For instance, most BLDC motor designs include copper wires connecting the BLDC motor to a circuit board or some other type of controller, and those wires could corrode if exposed to fuel. Additionally, assembly of fuel pump assemblies with BLDC motors may be laborious and costly.

SUMMARY OF THE INVENTION

One aspect of the present invention provides for a fuel pump assembly including an electric motor, such as a brushless direct current (BLDC) motor, and a circuit board operable to control a current directed to the electric motor with the circuit board being formed as a discrete component from the electric motor. At least one fastener of an electrically conductive material attaches the circuit board to the electric motor and establishes electrical communication between the circuit board and the electric motor. The use of the fasteners to establish electrical communication between these components eliminates (or at least reduces) the need for copper wires between these components, thereby improving the durability and longevity of the fuel pump assembly by reducing the risk of parts failing from corrosion. Additionally, the assembly of the fuel pump assembly is simplified since wires do not have to be connected between the circuit board and motor in addition to fasteners.

According to another aspect of the present invention, the electric motor 22 is a BLDC motor with a plurality of windings (coils) 26 and a plurality of terminals 211. Each of the terminals 211 has a threaded bore 211B and is in electrical communication with one of the windings 26. The fasteners 50 are screws which extend through the circuit board 42 and threadedly engage the respective terminals 211 to establish electrical communication (via fastener-to-coil conductor 201) between the circuit board 42 and the windings 26. This provides a particularly easily assembled fuel pump assembly without any corrosion-prone wires.

According to another aspect of the present invention, a method is provided for including the step of preparing an electric motor having at least one winding. The method continues with the step of preparing a circuit board as a discrete component from the electric motor. The method proceeds with attaching the circuit board to the electric motor with at least one fastener of an electrically conductive material, and wherein at least one fastener also establishes electrical communication between the circuit board and the electric motor.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 3 is a cross-sectional and enlarged fragmentary view of a portion of the exemplary fuel pump assembly of FIG. 1 and centered around the connection between the circuit board and the brushless direct current (BLDC) motor;

FIG. 4 is a top view of the printed circuit board of the exemplary fuel pump assembly of FIG. 1.

DESCRIPTION OF THE ENABLING EMBODIMENT

Figure 1:
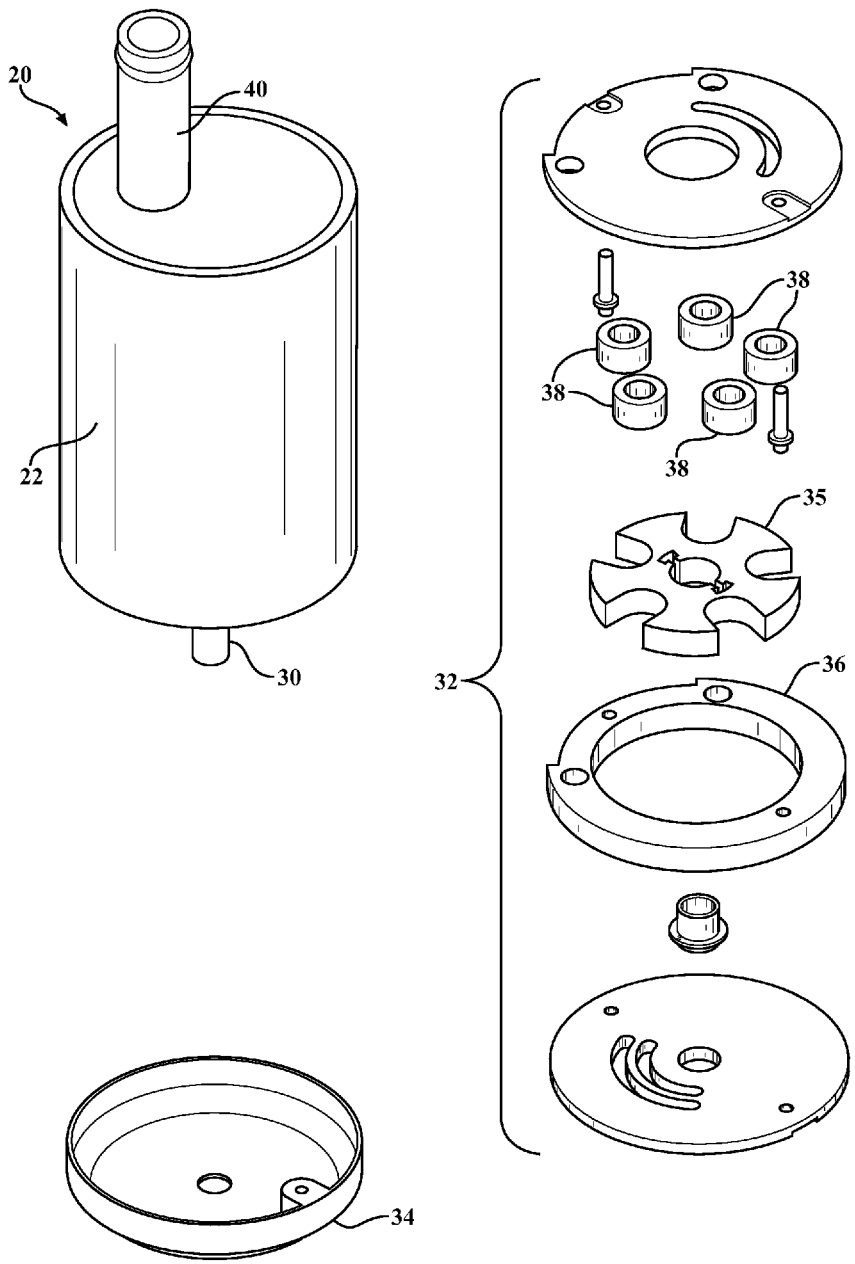
FIG. 1 is a partially exploded view of an exemplary fuel pump assembly.

Referring to the Figures, wherein like numerals indicate corresponding parts throughout the several views, an exemplary brushless direct current (BLDC) fuel pump assembly 20 constructed to one aspect of the present invention is generally shown in FIG. 1. The exemplary fuel pump assembly 20 is configured to propel fuel (such as gasoline or diesel fuel) from a fuel tank (not shown) to a fuel rail (not shown) of an automobile. However, it should be appreciated that the fuel pump assembly 20 could find many uses in many other automotive or non-automotive applications including, for example, boats, trucks, recreational vehicles, snowmobiles, all-terrain vehicles, lawn mowers, etc.

Figure 2:
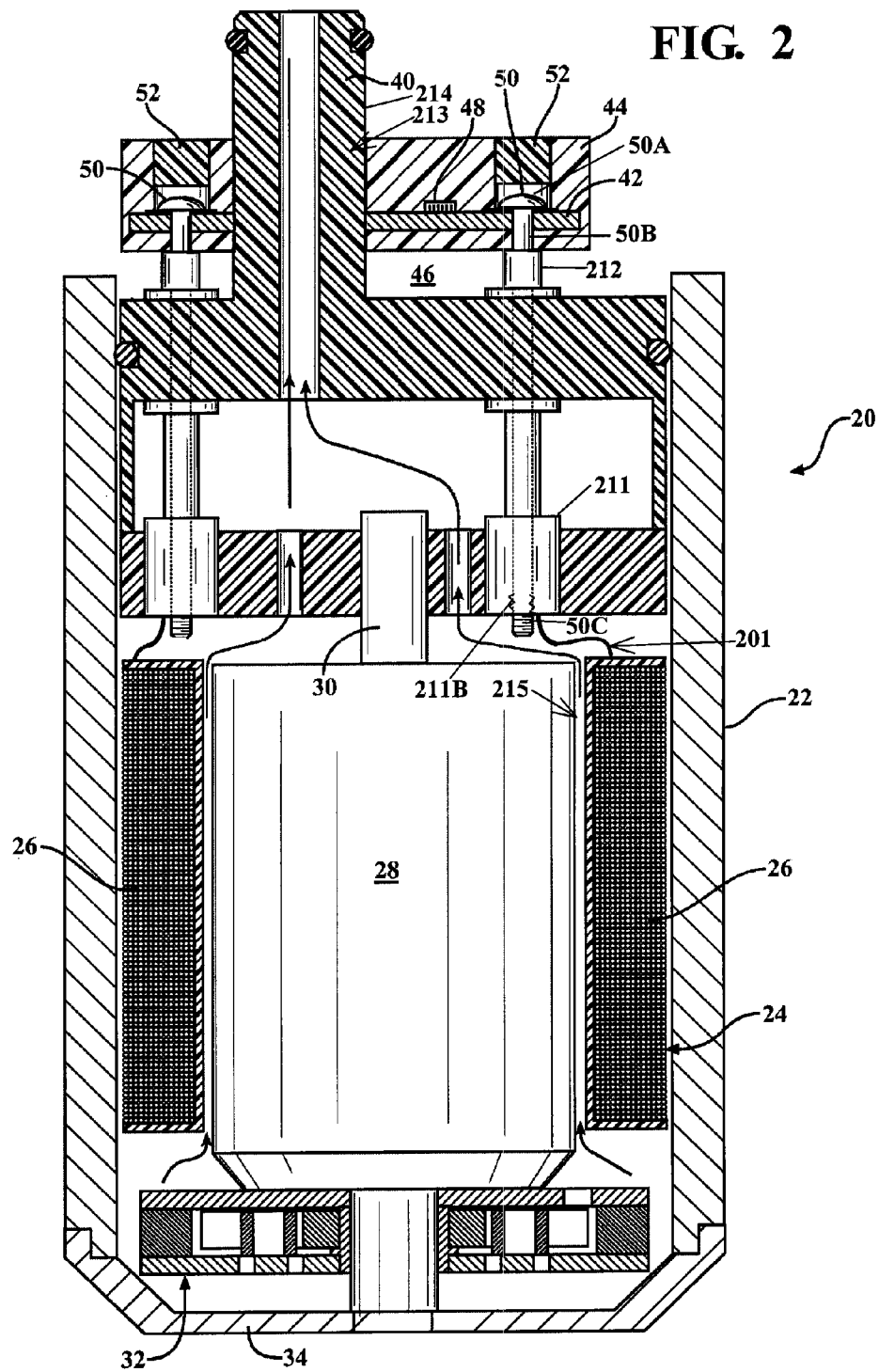
FIG. 2 is a partial cross-sectional view of the exemplary fuel pump assembly of FIG. 1.

Referring now to the cross-sectional view of FIG. 2, the exemplary fuel pump assembly 20 includes a BLDC motor 22 of conventional construction. Specifically, the BLDC motor 22 has a stator 24 with a plurality of windings 26 of wires electrically insulated and spaced circumferentially from one another. A rotor 28 including a plurality of magnets (preferably permanent magnets) is disposed within the stator 24, and a shaft 30 is attached to the rotor 28. In a manner typical of BLDC motors 22, when a current is applied to one or more of the windings 26, an electromagnetic field is generated which acts on the magnets to rotate the rotor 28 and the shaft 30. The magnets could be any suitable type of permanent or non-permanent magnets including, for example, neodynium magnets.

Referring back to FIG. 1, the exemplary fuel pump assembly 20 also includes a roller-style pump mechanism 32 attached via the shaft 30 to the rotor 28 of the BLDC motor 22. The exemplary pump mechanism 32 includes an inlet cap 34 which adjoins to the lower end of the BLDC motor 22. The inlet cap 34 captures a cam ring 36 surrounds the pump 35 and an array of rollers 38. In a manner typical of roller-style pump mechanisms 32, when the shaft 30 is rotated by the BLDC motor 22, it drives the rollers 38 in an orbit around the inner circumference of the cam ring 36. Movement of the rollers 38 relative to pickets in the pump 35 and the cam ring 36 displaces the fuel in the fuel tank and sucks it through an opening in the inlet cap 34. A filter (not shown), such as a fuel sock, may also be disposed within or outside of the inlet cap 34 for screening the fluid as it is drawn through the opening of the inlet cap 34. As indicated with arrows in FIG. 2, the pump mechanism 32 forcibly pumps the fuel through a passage 215 in the BLDC motor 22 and through an outlet cap 40. While the fuel is flowing through the passage 215 within the BLDC motor 22, it may act as a cooling medium to cool the BLDC motor 22. It should be appreciated that the fuel pump assembly 20 could alternately include any suitable type of pump mechanism 32 to propel the fuel including, for example, other types of positive displacement style pump mechanisms or impeller style pump mechanisms.

In the exemplary embodiment of FIG. 2, the fuel pump assembly 20 includes a generally annularly-shaped printed circuit board (PCB 42) disposed within a generally puck-shaped housing 44 for controlling the BLDC motor 22 is at least partially spaced in an axial or vertical direction from the outlet cap 40 of the BLDC motor 22 to present a gap 46 between the housing 44 and the BLDC motor 22. Liquid fuel in the fuel tank may flow into the gap 46 between the PCB 42 and BLDC motor 22 to cool each of these components. It should be appreciated that the gap 46 could have any desirable width or the housing 44 and BLDC motor 22 could directly abut one another such that the gap 46 is non-existent. In the exemplary embodiment, the housing 44 and PCB 42 each have an opening 213 for receiving an outlet stem 214 of the outlet cap 42.

Referring now to FIG. 4, a plurality of electrical devices 48 (e.g. metal-oxide semiconductor field-effect transistors or capacitors) are mounted on the exemplary PCB 42 for controlling a current to be directed to the windings 26 of the stator 24. The PCB 42 could be connected to an electrical system of a vehicle through any desirable means. As shown in FIG. 2, the PCB 42 and the electrical devices 48 mounted thereon are encased in the material of the housing 44 for protection from the fuel which could otherwise damage the PCB 42 and the electrical devices 48. During the assembly process, the PCB 42 with the electrical devices 48 mounted thereon are preferably deposited into a mold cavity which is then filled with a resin of, for example, a polymeric material. This resin is preferably injection molded under pressure and in a fluidic condition to forcibly drive the resin into all interstitial spaces of the mold cavity, thereby minimizing the risk of air pockets being formed around the PCB 42. Thus, once the resin cools, the housing 44 at least partially encapsulates and is in direct contact with the electrical devices 48 and with the PCB 42 to protect these components from the fuel in the fuel tank and also to at least partially insulate these elements electrically from the surrounding environment. The housing 44 may also convey heat away from the PCB 42 to provide further protection to the PCB 42.

A plurality of fasteners 50 of an electrically conductive material extends between the BLDC motor 22 and the PCB 42 to attach the housing 44 and the PCB 42 to the BLDC motor 22 and also to convey a current between the PCB 42 and the BLDC motor 22 to power the BLDC motor 22. Preferably, each fastener 50 is associated and in electrical communication (via fastener-to-coil conductor 201) with a single winding 26 for providing electrical power to only that winding 26. The exemplary PCB 42 includes a plurality of apertures 200B through which the fasteners 50 extend, and the apertures 200B are preferably plated with an electrically conductive material 210 to establish electrical communication between the PCB 42 and the fasteners 50. In the exemplary embodiment, each fastener 50 is a screw 50, which extends through the PCB 42 and the housing 44 to threadedly engage at least a portion of the BLDC motor 22. Alternately, the screws 50 could threadedly engage a plurality of electrical terminals 211 which are in electrical communication with the windings 26.

The exemplary fuel pump assembly 20 additionally includes a plurality of seals 52 for sealing the screws 50 to the puck-shaped housing 44 to prevent fluid from contacting the heads of the screws 50, thereby further protecting the PCB 42 from fluid damage. It should be appreciated that the fasteners 50 could be any desirable type of electrically conductive fastener 50 including various types of screws, bolts, pins, etc. The fasteners 50 are preferably formed of stainless steel for structural, cost, electrical conductivity and corrosion resistance purposes. However, it should be appreciated that the fasteners 50 could be formed of any suitable electrically conductive material.

The PCB housing 44 includes a top housing layer 44A that overlies the PCB 42 and a bottom housing layer 44B that underlies the PCB 42. A top aperture 200A extends through the top housing layer 44A. The middle aperture 200B extends through the PCB 42. A bottom aperture 200C extends through the bottom housing layer 44B. A head structure 50A of the fastener 50 is located in the top aperture 200A and engages a top surface of the PCB 42. A shank structure 50B of the fastener 50 extends from the head structure 50A, through the middle and bottom apertures 200B, 200C and into the motor 22. A screw thread 50C on the shank structure 50B of the fastener 50 threadedly engages the motor 22. The fastener-to-coil conductor 201 in the motor 22 electrically connects the shank structure 50B to the coil 26. The fastener-to-coil conductor 201 includes an electrical terminal 211 that contains a threaded bore 211E1 into which the fastener thread 50C is threadedly engaged. Coil-powering current is conducted by the fastener 50 from the PCB 42 to the conductor 201 in the motor 22 to power the coil 26. The PCB housing 44 is spaced away from the motor 22, to define a gap 46 between the PCB housing 44 and the motor 22, to enable fluid to flow into and out of the gap 46 to cool the PCB 42. The opening 213 extends through the housing layers 44A, 44B and the PCB 42. The outlet stem 214 projects from the motor 22 and through the opening 213. The pump pumps liquid to flow through the passage 215 between the rotor 28 and the stator coil 26 and out of the motor 22 through the outlet stem 214. A spacer 212 spaces the PCB housing 44 away from the motor 22 to define the gap 46.

Figure 5:
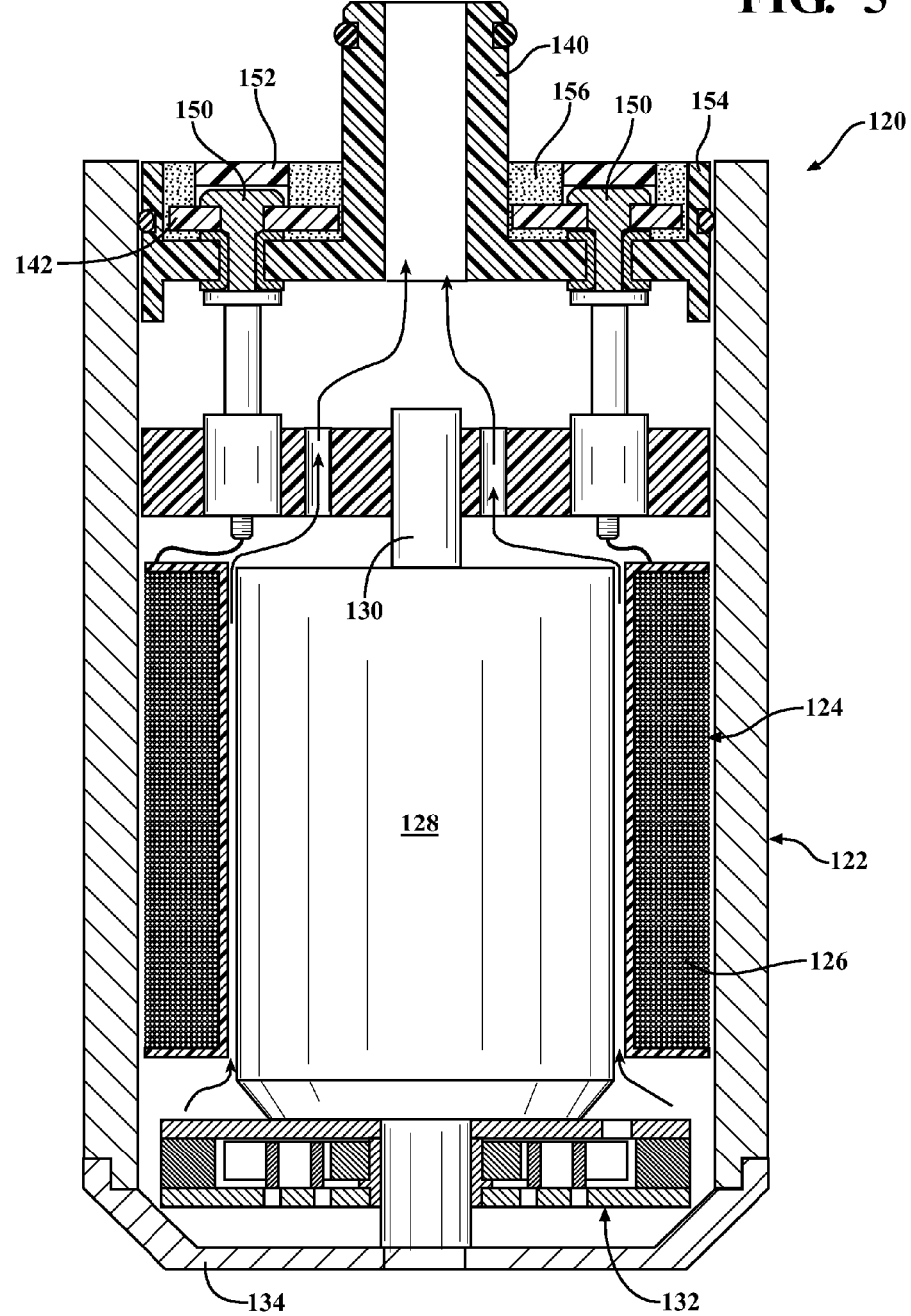
FIG. 5 is a partial cross-sectional view of an alternate embodiment of the fuel pump assembly.

Referring now to FIG. 5, another exemplary fuel pump assembly 120 is generally shown. In this alternate embodiment, the BLDC motor 122 (including the rotor 128, stator 124, windings 126 and shaft 130), pump mechanism 132 and inlet cap 134 are similar to the embodiment described above. The alternate embodiment is distinguished from the above-described embodiment by the outlet cap 140 including an outer wall 154 which extends axially upwardly away from the BLDC motor 122 to present a generally puck-shaped opening. The PCB 142 is disposed within this puck-shaped opening and is attached to the BLDC motor 122 assembly via a plurality of fasteners 150 which also electrically connect the PCB 142 and the BLDC motor 122 to power the BLDC motor 122. The exemplary fasteners 150 are screws 150 which extend through the PCB 42 and threadedly engage the BLDC motor 122. Each screw 150 preferably is in electrical communication with only one of the windings 126 in the stator 124 of the BLDC motor 122 to only control that winding 126.

The puck-shaped opening around the PCB 142 is filled with an electrically insulating and thermally conductive potting material 156 which protects the PCB 142 from the surrounding environment, and a seal 152 seals the screws 150 from the exterior environment. This aspect of the invention may be advantageous because the housing 154 for the circuit board 142 is integrated into the outlet cap 140, thereby reducing the number of separate components in the fuel pump assembly 120 and providing for more efficient assembly of the fuel pump assembly 120. It should be appreciated that the outlet cap 140 with the integrated housing 154 for the PCB 142 could have any suitable shape and could include cooling gaps (not shown) for receiving liquid fuel between the PCB 142 and the BLDC motor 122 to cool these components.

Obviously, many modifications and variations of the present invention are possible in light of the above teachings and may be practiced otherwise than as specifically described while within the scope of the appended claims.

What is claimed is:

1. A motor assembly comprising:
   a motor including:
     a rotor, and
     a stator coil disposed alongside the rotor;
   a printed circuit board (PCB) configured to control electric coil-powering current to the coil to electromagnetically urge the rotor to rotate, the PCB having a top surface facing away from the stator coil;
   a PCB housing that encapsulates the PCB, wherein the PCB housing includes a top housing layer overlying the PCB and a bottom housing layer underlying the PCB;
   top, middle and bottom apertures that respectively extend through the top housing layer, the PCB and the bottom housing layer;
   an electrically-conductive PCB contact on the PCB's top surface adjacent the middle aperture;
   an electrically-conductive fastener that secures the PCB to the motor, the fastener including:
     a head structure located in the top aperture, that engages a top surface of the PCB contact,
     a shank structure that extends from the head structure, through the middle and bottom apertures, and into the motor, and
     a screw thread, on the shank structure, that threadedly engages the motor; and
   a fastener-to-coil conductor in the motor that electrically connects the shank structure to the coil;
   for the coil-powering current to flow from the PCB contact, through the fastener's head structure and through the shank structure to the fastener-to-coil conductor in the motor to power the coil.

2. The motor assembly of claim 1, wherein the rotor is configured to rotate about a rotational axis, and wherein the PCB is on the rotational axis and above the stator coil.

3. The motor assembly of claim 1, wherein:
   the stator coil is one of multiple stator coils disposed alongside the rotor;
   each of the top, middle and bottom apertures is one of multiple respective top, middle and bottom apertures that respectively extend through the top housing layer, the PCB and the bottom housing layer;
   the PCB contact is one of multiple electrically-conductive PCB contacts, each PCB contact being on the PCB's top surface and adjacent a respective one of the middle apertures;
   the fastener is one of multiple electrically-conductive fasteners that secure the PCB to the motor, each fastener including:
     a head structure located in the top aperture, that engages a top surface of a respective one of the PCB contacts,
     a shank structure that extends from the head structure, through the respective middle and bottom apertures, and into the motor, and
     a screw thread, on the shank structure, that threadedly engages the motor; and
   the fastener-to-coil conductor is one of multiple fastener-to-coil conductors in the motor, each fastener-to-coil conductor electrically connecting the shank to at least one of the stator coils;
   for, with respect to each fastener, coil-powering current to flow from the respective PCB contact, through the fastener's head structure and through the shank structure to the respective fastener-to-coil conductor in the motor to power the respective stator coil.

4. The motor assembly of claim 3, further comprising, for each of the fasteners, a spacer that is sandwiched between the PCB housing and the motor to space the PCB housing away from the motor to define a gap between the PCB housing and the motor, to enable fluid to flow into and out of the gap to cool the PCB.

5. The motor assembly of claim 4, wherein the motor assembly is located in a fuel tank, to enable fuel in the tank to flow into and out of the gap to cool the PCB.

6. The motor assembly of claim 1, wherein the fastener is a screw.

7. The motor assembly of claim 1, wherein the fastener-to-coil conductor includes an electrical terminal that is in the motor and that contains a threaded bore into which the screw thread is threadedly engaged, for the coil-powering current to flow from the top surface of the PCB contact, through the fastener's head structure and through the shank structure to the threaded electrical terminal to power the coil.

8. The motor assembly of claim 1, further comprising a sealing plug, located in the top aperture and above the fastener head, that seals the top aperture to prevent fluid from contacting the fastener's head structure.

9. The motor assembly of claim 1, wherein the PCB housing is in direct contact with the electrical devices of the PCB.

10. The motor assembly of claim 1, wherein the motor assembly is brushless.

11. The motor assembly of claim 1, wherein all rotating parts of the motor assembly are encased in a common motor housing.

12. The motor assembly of claim 1, wherein the PCB contact surrounds the middle aperture.

13. The motor assembly of claim 1, wherein the fastener-to-coil conductor in the motor is spaced away from the PCB, to form a gap that is spanned by the fastener shank and located between the PCB and the fastener-to-coil conductor.

14. The motor assembly of claim 13, wherein the gap spanned by the fastener shank includes (i) the bottom housing layer and (ii) a fluid-flow space for fluid to flow in and out of.

15. The motor assembly of claim 1, further comprising:
   a liquid pump that is driven by motor, and
   a housing that houses the rotor, the stator coil and the pump.

16. The motor assembly of claim 15, wherein the rotor rotates about a rotational axis, and wherein the coil is located axially between the PCB and the pump.

17. The motor assembly of claim 15, further comprising:
   an opening that extends through the top housing layer, the PCB and the bottom housing layer; and
   an outlet stem projecting from the motor and through the opening;
   wherein the pump is configured to pump the liquid to flow through a passage between the rotor and the stator coil and out of the motor through the outlet stem.

* * * * *